W. PAINTER.
Hose-Coupling.
No. 160,700.  Patented March 9, 1875.
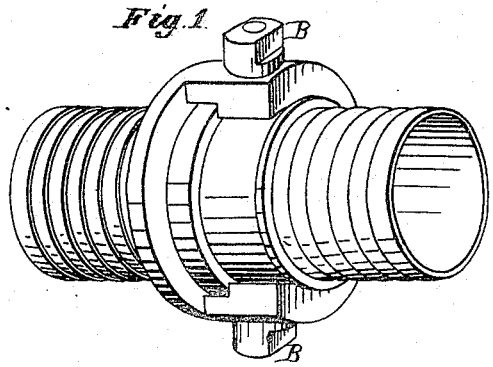
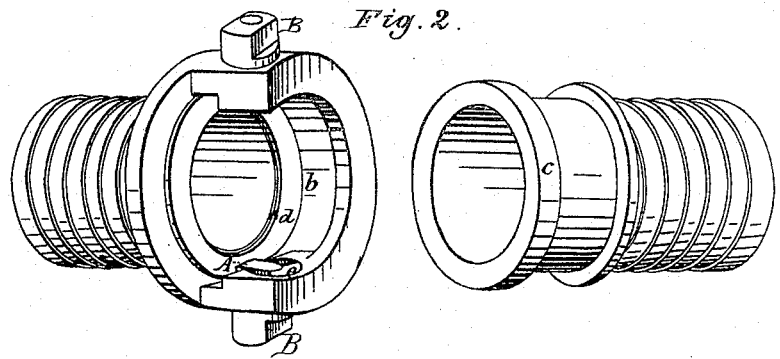
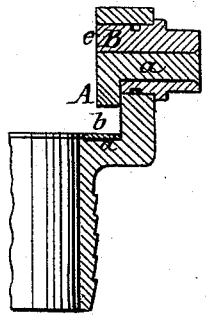
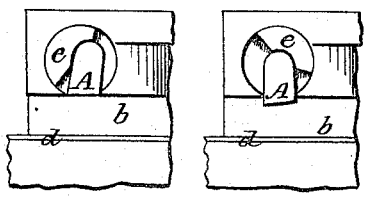
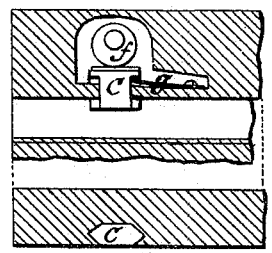
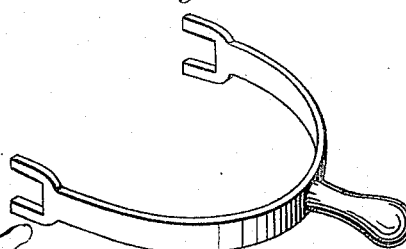
Witnesses  
Philip F. Larner  
A. B. Cauldwell
Inventor.  
William Painter  
By Wm E. .....  
Attorney

UNITED STATES PATENT OFFICE.

WILLIAM PAINTER, OF BALTIMORE, MARYLAND.

IMPROVEMENT IN HOSE-COUPLINGS.

Specification forming part of Letters Patent No. 160,700, dated March 9, 1875; application filed December 22, 1874.

*To all whom it may concern:*

Be it known that I, WILLIAM PAINTER, of the city and county of Baltimore, in the State of Maryland, have invented certain new and useful Improvements in Hose-Couplings.

My said improvements relate to a locking device adapted to that class of couplings which are connected and disconnected by a lateral movement of the two parts, instead of a longitudinal movement thereof, as illustrated in the case of screw-couplings, and those which unite by means of spring-latches, after having been brought together by a longitudinal movement of the parts. The class of couplings to which my said improvements are applicable may be described as having one member of the coupling provided with a plain annular flange, and the other or receiving member provided with an annular face, for engaging with the face of the annular flange of the entering member, and a semi-annular recess for receiving a corresponding portion of the flange.

Such couplings have heretofore been provided with devices which not only lock the two parts together, but force the coincident faces of the flange and receiving member into close contact.

My invention consists in combining with the receiving member of the coupling a locking and compressing device, which, in engaging with and on leaving the rear surface of the annular flange of the entering member of the coupling, moves in a line practically at right angles to said surface, whereby the points of contact between said compressing device and the flange are prevented from that undue liability to wear which is incident to the employment of devices heretofore used, which, in locking and unlocking, present surfaces which move in lines parallel with the rear surface of said flange; and I do hereby declare that the following specification, taken in connection with the drawings furnished, and forming a part of the same, is a true and accurate description of my invention, and of couplings embodying the same.

Referring to the drawings, Figure 1 represents, in perspective, one of my improved couplings. Fig. 2 represents the same detached. Fig. 3 represents one of the locking devices in section. Fig. 4 represents, in different positions, two of the locking devices in front view. Fig. 5 represents a modification thereof. Fig. 6 represents a hose-wrench.

The locking device will preferably be composed of but two elements—an engaging-finger and an actuating device. In Figs. 2 and 3 the engaging-finger is shown at A. It is, in this instance, mounted on a spindle, $a$, which is eccentrically located in the actuating device B, which, in this instance, consists of a rotating wrench-plug fitted to bearings in the socket-walls of the receiving member of the coupling, and fitted also at its outer end so as to be readily rotated by means of a wrench. The operative end of the finger A passes through an opening of proper size into the semi-annular recess $b$, which receives the flange $c$ of the entering member of the coupling, so that when the two parts of the coupling are united the end of the finger will, by the rotation of the wrench-plug, forcibly engage with the rear surface of the flange $c$, and force its face into close contact with the coincident surface of an annular packing-ring, as at $d$, which is recessed in the receiving member of the coupling. In order to relieve the finger-spindle $a$ from undue strain, and to render it more durable, I provide a cam-block, as at $e$, which, on rotation of the wrench-plug, moves correspondingly with the movement of the finger, and operates after the manner of a wedge in contributing force to the finger independently of its spindle $a$. This cam-block is, in fact, an extended portion of the wrench-plug, and its exterior curved surface engages with the interior surface of the recess formed by an extension of the wrench-plug bearings, while its opposite concave surface engages with the inner or convex end of the finger.

It will be seen that the rotation of the wrench-plug in one direction will force the finger downward, and that the cam-block, moving with the plug, advances its thickest end, and continuously operates as a solid forcing-abutment, engaging with the finger and with the walls of the recess, as clearly shown in Fig. 4. On reversely rotating the wrench-plug, the finger moves upward with its spindle, the cam-block advancing its thickest end, and practically retreating, so as to admit of said movement.

In Fig. 5 I show a finger at C, which is combined with a rotating cam at $f$ on the inner end of a wrench-plug similar to that already described. The rotation of the cam forces down the finger, and a spring at $g$ lifts the finger when the cam is reversely rotated. In this instance the surface of the finger in contact with the cam may be provided with a hardened plate, whereby great durability of the wearing parts will be secured; and, should occasion require, such a construction will admit of readily replacing a worn plate by a new one at slight expense. In each instance the finger moves to and from the rear surface of the flange in a line at right angles to said surface, and, therefore, no undue wear of the end of the finger, nor the surface of the flange, can occur.

With hose employed in conducting offensive matter from privy-vaults, cess-pools, &c., to transit-tanks, it is essential that the couplings be air-tight as well as practically water-tight, and it is for this special service that my couplings are intended. Should a cam, for instance, be employed for engaging directly with the rear surface of the entering flange, the latter would soon have a series of concave depressions, which would prevent the cam from continuing to so force the face of the flange against its coincident packing-ring as to secure the air-tight joint desired. This fact will be readily obvious when it is considered that such couplings are usually made of brass or other equally soft metal.

Both wrench-plugs may be simultaneously rotated by means of a forked wrench, as illustrated in Fig. 6.

I am aware that various devices other than those shown may be employed to actuate the locking-fingers and secure the requisite longitudinal movement thereof; and although I claim specially one of the means herein described, I desire it to be distinctly understood that the main feature of my invention consists in operating the locking-fingers in lines practically at right angles to the surface of the flange, with which they engage, regardless of the precise means which may be employed for giving them such movement.

Having thus described my invention, I claim as new and of my own invention—

1. In a hose-coupling the members of which are connected and disconnected by a lateral movement thereof, the combination, with the receiving member, of locking-fingers, arranged to move to and from the rear surface of the flange of the entering member in lines practically at right angles to said surface, substantially as described, whereby undue abrasion of the flange and locking-finger at their points of contact is obviated, as specified.

2. The combination of the wrench-plug and finger, mounted on a spindle eccentrically located in the wrench-plug, substantially as described.

3. The combination, with the wrench-plug and finger, of the cam-block, substantially as described.

WILLIAM PAINTER.

Witnesses:
JAMES L. MURRILL,
JOHN F. GROUND.